(12) United States Patent
Morrow

(10) Patent No.: US 7,528,727 B2
(45) Date of Patent: May 5, 2009

(54) TRACKING DEVICE FOR POLYMERIC PACKAGING

(75) Inventor: J. Mark Morrow, Camden, SC (US)

(73) Assignee: Sonoco Development, Inc., Hartsville, SC (US)

( * ) Notice: Subject to any disclaimer, the term of this patent is extended or adjusted under 35 U.S.C. 154(b) by 236 days.

(21) Appl. No.: 11/197,640

(22) Filed: Aug. 4, 2005

(65) Prior Publication Data

US 2007/0030151 A1  Feb. 8, 2007

(51) Int. Cl.
*G08B 13/14* (2006.01)

(52) U.S. Cl. ............... 340/572.8; 340/572.9; 340/568.1

(58) Field of Classification Search ............. 340/568.1, 340/572.1, 572.3, 572.4, 572.7, 572.8, 571, 340/539.26, 10.1; 283/81, 101; 428/192
See application file for complete search history.

(56) References Cited

U.S. PATENT DOCUMENTS

| | | | |
|---|---|---|---|
| 4,024,976 A | 5/1977 | Acton | |
| 5,081,446 A | 1/1992 | Gill et al. | |
| 5,241,299 A * | 8/1993 | Appalucci et al. | 340/572.3 |
| 5,499,015 A | 3/1996 | Winkler et al. | |
| 5,714,935 A | 2/1998 | Ryan, Jr. | |
| 6,153,287 A | 11/2000 | Gasnier | |
| 6,177,871 B1 | 1/2001 | Rasband | |
| 6,199,309 B1 | 3/2001 | Markarian | |
| 6,201,474 B1 | 3/2001 | Brady et al. | |
| 6,209,290 B1 | 4/2001 | Boriani et al. | |
| 6,216,860 B1 | 4/2001 | Boriani et al. | |
| 6,294,114 B1 | 9/2001 | Muirhead | |
| 6,591,981 B2 | 7/2003 | Draghetti | |
| 6,648,232 B1 | 11/2003 | Emmert | |
| 6,661,339 B2 | 12/2003 | Muirhead | |
| 6,749,418 B2 | 6/2004 | Muirhead | |
| 6,752,431 B1 * | 6/2004 | Matthews et al. | 283/81 |
| 6,943,678 B2 | 9/2005 | Muirhead | |
| 7,098,794 B2 * | 8/2006 | Lindsay et al. | 340/572.3 |
| 7,106,202 B2 * | 9/2006 | Dickinson | 340/572.8 |
| 7,142,124 B2 * | 11/2006 | Chi et al. | 340/612 |
| 7,151,455 B2 * | 12/2006 | Lindsay et al. | 340/572.3 |
| 7,180,423 B2 * | 2/2007 | Forster et al. | 340/572.7 |
| 7,253,735 B2 * | 8/2007 | Gengel et al. | 340/572.7 |
| 7,261,539 B2 | 8/2007 | Pitscheneder et al. | |
| 7,323,990 B2 | 1/2008 | Urban | |
| 2002/0030597 A1 | 3/2002 | Muirhead | |
| 2002/0067270 A1 | 6/2002 | Yarin et al. | |
| 2002/0196146 A1 | 12/2002 | Moore | |
| 2005/0099304 A1 * | 5/2005 | Humphrey | 340/572.8 |
| 2005/0241548 A1 | 11/2005 | Muirhead | |
| 2006/0220868 A1 * | 10/2006 | Takasawa et al. | 340/572.1 |
| 2007/0257857 A1 * | 11/2007 | Marino et al. | 343/867 |

FOREIGN PATENT DOCUMENTS

| | | |
|---|---|---|
| DE | 42 42 992 | 12/1992 |
| FR | 2 688 483 | 3/1992 |
| GB | 2 210 235 | 6/1989 |

\* cited by examiner

*Primary Examiner*—Van T. Trieu
(74) *Attorney, Agent, or Firm*—Alston & Bird LLP

(57) ABSTRACT

A package and method for products is provided. The package includes a non-planar package comprising a wall formed of polymeric material, and at least one tracking device partially embedded within a thickness of the wall during forming of the package such that the tracking device is exposed and visible on a surface of the package.

20 Claims, 1 Drawing Sheet

TRACKING DEVICE FOR POLYMERIC PACKAGING

BACKGROUND OF THE INVENTION

Figure 1:
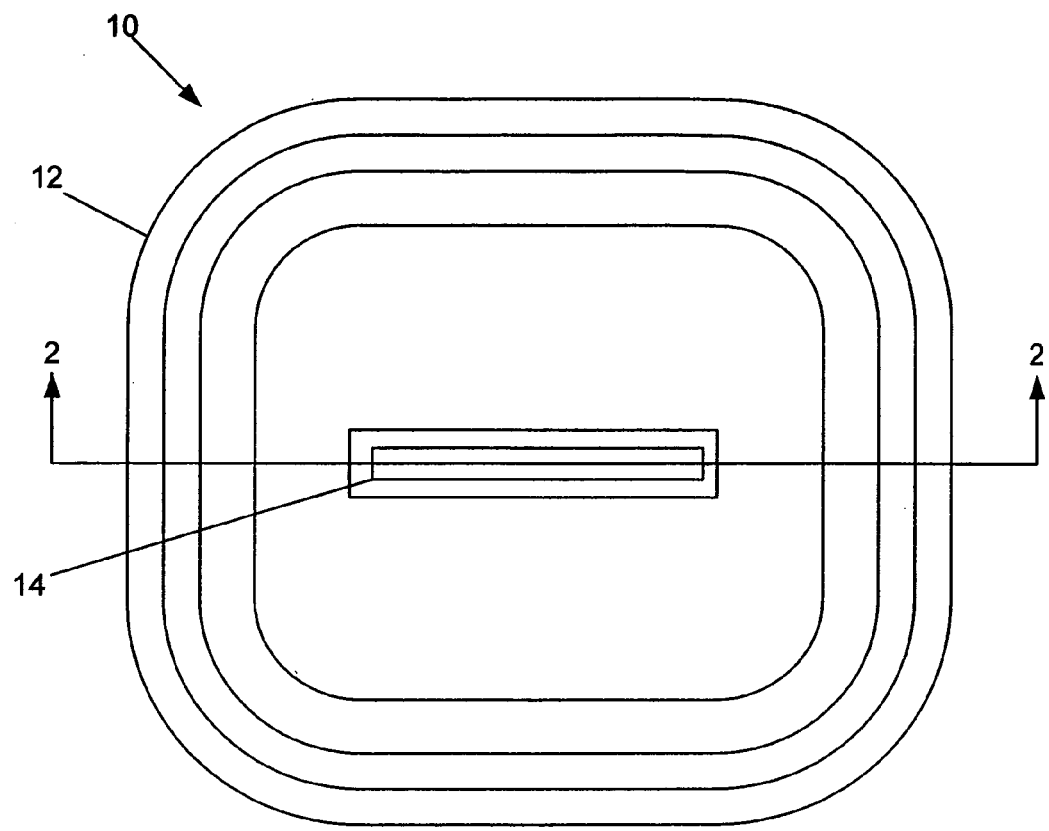

The present invention relates to packages formed of polymeric materials. In particular, the present invention relates to packaging that incorporates a tracking device to deter and detect theft and/or to track packages during filling, shipping, and retailing.

It is becoming increasingly common for the operators of retail establishments to attach tracking devices to products to deter and detect shoplifting. A number of different types of tracking devices and detector systems have been developed and are in use. Generally, all tracking devices include a detection zone formed by a transmitter and a receiver. The transmitter and receiver are positioned at the exit of the retail establishment such that consumers must pass through the detection zone in order to exit the establishment. The transmitter sends a magnetic or radio frequency signal at one or more predetermined frequencies to the receiver. When an active tracking device enters the detection zone, the tag creates a change or disturbance in the received signal, which is detected by the receiver.

One example of a tracking device is a radio frequency identification ("RFID") device. RFID devices can be used for the tracking of items through manufacturing, in inventory, in shipment, and the like. Generally, an RFID device comprises a tag that includes an integrated circuit (IC) chip microprocessor and a resonant circuit formed by a coiled antenna and a capacitor. In a passive RFID system, a reader generates a magnetic field at a predetermined frequency. When an RFID device, which usually can be categorized as being either read-only or read/write, enters the magnetic field, a small electric current forms in the device's resonant circuit. This circuit provides power to the device, which then modulates the magnetic field in order to transmit information that is pre-programmed on the device back to the reader at a predetermined frequency, such as 125 kHz (low frequency) or 13.56 MHz (high frequency). The reader then receives, demodulates, and decodes the signal transmission, and sends the data on to a host computer associated with the system for further processing. An active RFID system operates in much the same way, but in an active system the RFID device includes its own battery, allowing the device to transmit data and information at the touch of a button.

RFID tags typically take the form of a small block of material or a flat sheet that may be embedded in layers of paper or polymeric material that protect the tag from damage and provide a larger surface area for securing the RFID tag to a label or the like. A label containing an RFID tag is then applied to a package. However, labels can become damaged during transportation and storage of the package, which may also damage the RFID tag, resulting in potential malfunction of the RFID tag. In addition, if the RFID tag is connected to a label by an adhesive substrate, the RFID tag may be easily removed by a shoplifter or the like, which circumvents the theft protection provided by the RFID tag. Moreover, conventional RFID tags are often attached by hand labor or robotics, which is expensive and time consuming.

At least some types of tracking devices cannot be used with composite containers having foil-based liners because the metal foil interferes with the tracking device. Accordingly, packaging composed entirely of polymer materials have been contemplated, such as that described in U.S. Pat. No. 6,153,287 to Gasnier, which discloses food product packaging having a built-in, anti-theft marking device. The '287 patent discloses that the theft-proof marking device cannot be removed, pulled away, or eradicated from the package even if the thief has located its probable or definite position. Additionally, the theft-proof marking device is integrated into the structure of the material for packaging the product such that the device is totally hidden or concealed without the use of covers, labels, or protections of any kind. The '287 patent also describes a molded plastic tray in which a wire element is incorporated into the mass to be molded before passage into the mold, or applied before molding to the wall of the mold at the location where the tray is to be integrated. Alternatively, the wire element is placed between layers of a multi-layer film lid.

Despite prior developments in incorporating tracking devices within polymeric packaging, improvements are desired in anti-theft packaging and/or tracking packaging and methods of forming the same. In particular, it would be advantageous to provide a tracking device that is visible on a surface of the polymeric container so that the device will provide theft deterrence. In addition, it would be advantageous to provide a method for forming a polymeric container where the tracking device is incorporated into a forming process to more easily incorporate the device into the packaging while also maintaining its functionality.

BRIEF SUMMARY OF THE INVENTION

The present invention addresses the above needs and provides other advantages, by providing a polymeric package having a tracking device incorporated into the package. In this regard, the tracking device is partially embedded within a portion of the package such that the tracking device remains exposed and visible on a surface of the package. Furthermore, a method for forming a package includes forming a polymeric material about the tracking device such that the tracking device is partially embedded within the material and is also exposed and visible. Typically, the tracking device is formed on an exterior surface of the package such that a consumer or seller may readily notice the presence of the tracking device.

In accordance with one embodiment of the invention, a product package comprises a non-planar package having a wall formed of a polymeric material, such as a thermoformable and injection moldable polymeric material. The package also includes at least one tracking device partially embedded within a thickness of the package during forming of the package such that the tracking device is exposed and visible on a surface of the package. For example, the tracking device could be partially embedded within a side wall and/or a base of the package.

In various aspects of the package, the tracking device could be an electromagnetic surveillance device such as an RFID tag, or one or more strips of metallic material. The tracking device could include a film or an adhesive that is applied to at least a portion of a surface of the tracking device. The film or adhesive is typically positioned adjacent to the surface of the package during forming of the package. In addition, the tracking device could be partially embedded within the thickness of the of the wall such that the tracking device is visible on an exterior surface of the package, facing away from an interior of the package. If visibility of the device is not desired, a label can be attached to the surface of the package to substantially conceal the tracking device from visibility.

An additional embodiment of the present invention provides a method for forming a package. The method includes providing a polymeric web, and positioning a tracking device on a portion of the polymeric web. The method further includes forming the polymeric web into a non-planar package such that the tracking device is partially embedded within a portion of the web and is exposed and visible on a surface of the package. For instance, the polymeric web could be thermoformed to form the package.

Variations of the method include attaching the tracking device to the polymeric web prior to forming the polymeric web into the package, such as by heating the polymeric web so that the tracking device adheres to the polymeric web. The step of forming could include forming the non-planar package such that the tracking device is visible on an exterior surface of the package, facing away from an interior of the package. Moreover, the method could further include attaching a label to the package such that the label substantially conceals the tracking device from visibility. The positioning step could include automatically positioning the tracking device on the polymeric web.

Another embodiment of the present invention provides a method for forming a package for products. The method includes positioning a tracking device within a mold, and forming a non-planar package with a polymeric material such that the tracking device is partially embedded within a portion of the material and is exposed and visible on a surface of the package. In various aspects of the method, the forming step includes injection molding the polymeric material within the mold. The method could further include attaching a label to the package such that the label substantially conceals the tracking device from visibility. In addition, the forming step includes forming the non-planar package such that the tracking device is visible on an exterior surface of the package, facing away from an interior of the package.

BRIEF DESCRIPTION OF THE SEVERAL VIEWS OF THE DRAWING(S)

Figure 2:
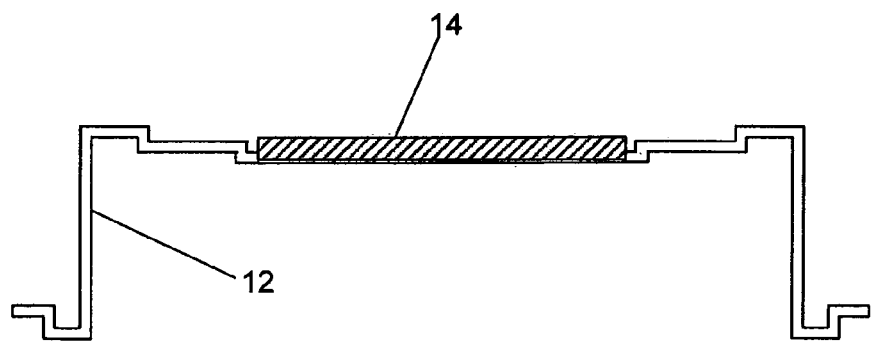

Having thus described the invention in general terms, reference will now be made to the accompanying drawings, which are not necessarily drawn to scale, and wherein:

FIG. 1 is a plan view of a package in accordance with one embodiment of the present invention; and FIG. 2 is a cross-sectional view of the package body shown in FIG. 1 along line 2-2.

DETAILED DESCRIPTION OF THE INVENTION

The present invention now will be described more fully hereinafter with reference to the accompanying drawings, in which some but not all embodiments of the invention are shown. Indeed, this invention can be embodied in many different forms and should not be construed as limited to the embodiments set forth herein; rather, these embodiments are provided so that this disclosure will satisfy applicable legal requirements. Like numbers refer to like elements throughout.

FIGS. 1-2 depict a package 10 in accordance with one embodiment of the invention. The package 10 includes a package body 12 having a tracking device 14 partially embedded therein. The tracking device 14 does not need to be incorporated with a label, as the device is attached to the package while forming the package 10. In addition, the tracking device 14 is formed within the package body 12 such that the tracking device is visible for identification and to deter theft of or tampering with the package 10.

As used herein, the term "package" is not meant to be limiting. Thus, the package 10 could be any container, body, or packaging capable of accommodating a tracking device 14, as described in further detail below. In addition, the package 10 is typically capable of carrying or otherwise accommodating one or more products therein. The package 10 is suitable for any number of products. Thus, the package 10 is not meant to be limited to any particular product or group of products, as the package is capable of being employed with a wide variety of products such as are commonly packaged in polymeric material packaging.

It is understood that the term "tracking device" is also not meant to be limiting, as the tracking device 14 could be any suitable tracking device, transponder, tag, electronic article surveillance (EAS) device, anti-theft device, or the like that is capable of transmitting and/or receiving signals, or that is remotely detectable by detection equipment, for monitoring or tracking a package associated with the tracking device. For example, the tracking device 14 may be a radiofrequency device, an RFID device, an acousto-magnetic system, an electromagnetic system, or a Bistatix® device. The tracking device 14 in some embodiments can be capable of storing data, which can be related to the tag itself, such as a serial number, and/or to the product or item that the device is associated with, such as product, manufacturing line, time and date of manufacture, location of manufacture, etc. Moreover, the tracking device 14 could be configured to communicate with other tracking devices. For instance, a tracking device 14 could be incorporated with an end or lid of a package 10 and communicate with a tracking device in the package body 12 during filling or sealing. Similarly, different packages within the same lot could include respective tracking devices that are capable of communicating with one another.

The acousto-magnetic system utilizes a tag having a magnetostrictive metal strip that changes length in response to a changing magnetic field, and a bias magnet that biases the magnetic field so that it is never zero. The magnetostrictive metal strip is driven at its predetermined resonant frequency by a radio frequency signal generated by the transmitter at the resonant frequency (typically about 58 kHz), and in response to this driving magnetic field, the strip resonates at that frequency. The transmitter sends the RF signal in pulses, and the tag continues to resonate for a short time after the end of each pulse. The receiver detects the signals emitted by the tag in response to the RF pulses. A microcomputer in the receiver checks the tag signals to ensure they are at the correct frequency, are time-synchronized to the pulses, are at the proper level, and are at the correct repetition rate. If all these criteria are met, an alarm is sounded to alert store personnel that an article bearing a still-active tag has passed in close proximity to the transmitter and receiver. The tag can be deactivated by demagnetizing the bias magnet incorporated into the tag.

The electromagnetic system employs a wire or ribbon of metal that has a high magnetic permeability in proximity to a piece of semi-hard magnetic material. The transmitter emits a low-frequency (typically less than 1 kHz) electromagnetic field that causes the metal ribbon to become magnetically saturated twice each cycle, and the metal ribbon emits an electromagnetic signal as a result. Saturation occurs abruptly and causes distinctive patterns in the signal emitted by the electromagnetic system, which are detected by the receiver. The electromagnetic system can be deactivated by magnetizing the semi-hard magnetic material, which saturates the metal ribbon and puts it in an inactive state. The electromagnetic system can also be reactivated by magnetizing the semi-hard magnetic material.

The tags used in acousto-magnetic and electromagnetic systems, as described above, generally are not "smart" in the sense that the tags do not store information; the tags simply emit a characteristic electromagnetic signal in response to a specific driving electromagnetic field so that the presence of the tags in the detection zone can be detected. In contrast, RFID devices may employ "smart" tags that can store information and be remotely "read" by a reader to extract that information.

The Bistatix® device operates much the same way as RFID devices except that the coiled antenna and capacitor of the RFID device are replaced by a printed, carbon-based material. As a result, a Bistatix device is extremely flat and relatively flexible, although currently these types of devices are limited to a frequency range of about 125 KHz. In addition, the read range of a Bistatix device is dependent on size, and for long read ranges a very large device may be required.

The package 10 is a polymeric material, including thermoplastic or thermoset materials. The polymeric material is capable of being formed into a package body 12 using any number of forming processes. For example, the package 10 could be formed using a polymeric web of material with thermoforming, compressing molding, and the like. Moreover, the polymeric material could be applied to a mold in a fluid or semi-fluid state and formed with injection molding, blow molding, compression molding, and the like. The polymeric material could be any number of suitable materials, such as polyethylene or polypropylene. Furthermore, the tracking device 14 could be formed with the package body 12 at various stages of the forming process.

In order to enhance the positioning or attachment of the tracking device 14 to a web of polymeric material, an adhesive or film, which could be heat-sensitive, could be applied to a base surface of the tracking device. For instance, the adhesive or film could be applied to the tracking device 14, and the polymeric web could be heated prior to thermoforming to initially secure the device to the hot web. The polymeric web could then be formed into a non-planar package.

The tracking device 14 may be secured within a thickness of a wall of the package body 12 at various locations. For instance, the tracking device 14 could be embedded within a base of the package body 12, as shown in FIG. 2. However, the tracking device 14 could be formed in one or more side walls and/or the base of the package body 12. Generally, the tracking device 14 would be positioned such that the device is visible to a consumer or seller. Thus, the tracking device 14 would be embedded within an exterior surface of the package body 12. However, the tracking device 14 could be partially embedded within an interior of the package body 12, such that the device is not readily apparent to the consumer. Moreover, the tracking device 14 could be covered with a label, liner, or similar covering material to hide the device from visibility if desired.

It is understood that the package body 12 and tracking device 14 shown in FIGS. 1 and 2 are not meant to be limiting, as there may be various sizes and configurations of the package 10 in various aspects of the present invention. For example, the package body 12 could be any non-planar shape, such as a cylinder, capable of accommodating various products. Moreover, the package body 12 may be various thicknesses depending on the type of product desired to be packaged therein, as well as the type of tracking device 14 used. For instance, although the tracking device 14 shown in FIG. 2 is shown as extending slightly beyond the base thickness of the package body 12, the package body could be much thicker such that the tracking device could be embedded within the base and/or wall of the package body at various depths. In addition, although the tracking device 14 is shown as being rectangular, it is understood that the tracking device could also be various shapes and sizes, and could include more than one tracking device in a single package 10.

Embodiments of the present invention provide several advantages. For example, the tracking device 14 is capable of being secured to a package body 12 during a forming process. As such, manufacturing costs are reduced since additional steps and materials typically required to attach the tracking device 14 to a package body 12 are eliminated. Moreover, the tracking device 14 is partially embedded so that the device is visible on a surface of the package body 12, which provides identification, as well as deterrence from theft and tampering. Furthermore, by not completely embedding the tracking device 14 within the package body 12, the walls of the package body are capable of being thinner than conventional packages. Thus, less material is required for a given package that completely envelopes the tracking device 14 since the tracking device will only extend partially within the wall of the package body 12. The tracking device 12 could be any suitable device, such as an RFID tag, that may provide various amounts of information and feedback relating to the package 10. Because the package 10 is a polymeric material, the effectiveness of the tracking device 14 is not sacrificed, and various forming processes may be employed to partially embed the device within the package body 12.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A package for products comprising:
   a non-planar package comprising a wall formed of polymeric material; and
   at least one tracking device partially embedded within a thickness of the wall during forming of the package such that at least a portion of the tracking device is exposed and visible on a surface of the package.

2. The package according to claim 1, wherein the tracking device comprises an electromagnetic surveillance device.

3. The package according to claim 2, wherein the electromagnetic surveillance device comprises an RFID tag.

4. The package according to claim 1, wherein the tracking device is partially embedded within at least one of a side wall or a base of the package.

5. A container according to claim 1, wherein the tracking device comprises at least one strip of metallic material.

6. The package according to claim 1, wherein the tracking device comprises a film or an adhesive applied to at least a portion of a surface of the tracking device, and wherein the tracking device is positioned such that the film or adhesive is positioned adjacent to the surface of the package during forming of the package.

7. The package according to claim 1, wherein the package comprises a thermoformable, blow moldable, or injection moldable polymeric material.

8. The package according to claim 1, further comprising a label attached to the surface of the package such that the label substantially conceals the tracking device from visibility.

9. The package according to claim 1, wherein the tracking device is partially embedded within the thickness of the wall such that the tracking device is visible on an exterior surface of the package, facing away from an interior of the package.

10. A method for forming a package for products comprising:
    providing a polymeric web;

positioning a tracking device on a portion of the polymeric web; and forming the polymeric web into a non-planar package such that the tracking device is partially embedded within a portion of the web and is exposed and visible on a surface of the package.

11. The method according to claim 10, further comprising attaching the tracking device to the polymeric web prior to forming the polymeric web into the package.

12. The method according to claim 11, wherein attaching comprises heating the polymeric web such that the tracking device adheres to the polymeric web.

13. The method according to claim 10, wherein forming comprises thermoforming the polymeric web around the tracking device.

14. The method according to claim 10, further comprising attaching a label to the package such that the label substantially conceals the tracking device from visibility.

15. The method according to claim 10, wherein forming comprises forming the non-planar package such that the tracking device is visible on an exterior surface of the package, facing away from an interior of the package.

16. The method according to claim 10, wherein positioning comprises automatically positioning the tracking device on the polymeric web.

17. A method for forming a package for products comprising:

positioning a tracking device within a mold; and forming a non-planar package with a polymeric material such that the tracking device is partially embedded within a portion of the material and is exposed and visible on a surface of the package.

18. The method according to claim 17, wherein forming comprises injection molding the polymeric material within the mold.

19. The method according to claim 17, further comprising attaching a label to the package such that the label substantially conceals the tracking device from visibility.

20. The method according to claim 17, wherein forming comprises forming the non-planar package such that the tracking device is visible on an exterior surface of the package, facing away from an interior of the package.

* * * * *